Jan. 13, 1953  A. G. EVANS  2,624,962
EARTH-WORKING IMPLEMENT
Filed Sept. 10, 1945  2 SHEETS—SHEET 1

Inventor:
Arthur G. Evans.
By Paul O. Pippel
Atty.

Jan. 13, 1953 A. G. EVANS 2,624,962
EARTH-WORKING IMPLEMENT
Filed Sept. 10, 1945 2 SHEETS—SHEET 2

Inventor:
Arthur G. Evans.
By Paul O. Pippel
Atty.

Patented Jan. 13, 1953

2,624,962

UNITED STATES PATENT OFFICE 2,624,962

EARTH-WORKING IMPLEMENT

Arthur G. Evans, Canton, Ill., assignor to International Harvester Company, a corporation of New Jersey Application September 10, 1945, Serial No. 615,452

3 Claims. (Cl. 37—155)

This invention relates to earth-working implements and particularly to an implement of the earth-moving or scraping type.

An object of the invention is to provide an improved earth-moving or scraping implement which may be utilized as a tool for leveling, grading, terracing, or the like.

Another object is to provide a novel lifting and control means for an earth-working implement.

A further object is to provide novel control means for a tractor-mounted earth-moving tool wherein the tool which extends transversely of the tractor is adjustable to various operating angles with respect to the line of travel of the machine but which when raised to transport position is caused to assume a position at right angles to the line of travel irrespective of the working angle assumed thereby.

Another object is to provide an earth-leveling machine having a scraping bowl or the like which is tiltable about an axis transverse to the direction of travel to dump the bowl when it is raised to transport position but which may be lifted through a preliminary range of movement without substantial tilting thereof to permit the spreading of accumulated earth at various heights.

Other objects and advantages of the invention will become clear from the following detailed description when read in conjunction with the accompanying drawings, wherein.

Figure 1:
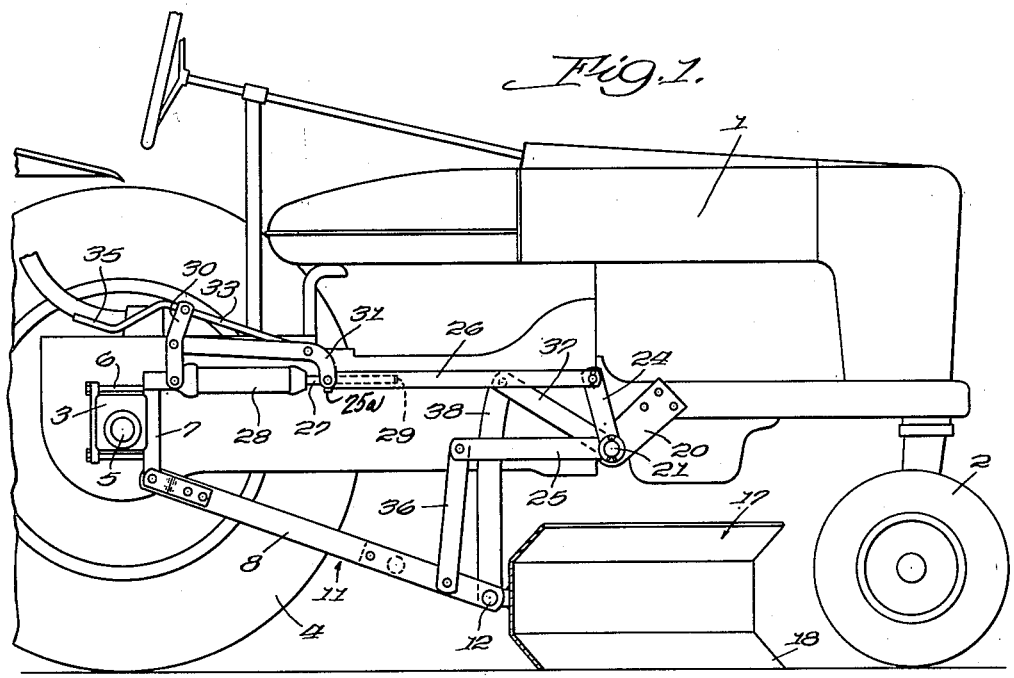
Figure 1 is a side elevation of a tractor having one rear wheel removed and showing an earth-leveling implement embodying the features of the present invention mounted thereupon.

Referring to the drawings, it will be noted that the implement of the present invention is mounted upon a tractor having a longitudinally extending body 1, dirigible front wheels 2, a rear axle structure 3, and rear drive wheels 4, each of which is mounted upon an axle 5 at opposite sides of the body. Secured to the rear axle structure 3 by bolts 6 is a supporting bracket 7, one at each side of the tractor body.

Pivotally attached to the lower end of each of the brackets 7 is a longitudinally extending bar 8. Bars 8 converge forwardly and are braced by a cross-piece 9 having side braces 10 bolted to the bars 8 near their forward ends to form a pivoted tool carrier or supporting structure for the working tool and generally indicated by the numeral 11. Between the forward ends of bars 8 is located an arched transversely extending shaft 12 having its ends rockably mounted in the ends of bars 8. Shaft 12 is centrally arched and has secured thereto intermediate its ends a forwardly projecting member 13 having as a part thereof a generally vertically extending sleeve portion 14 in which is rotatably received a bolt 15. Bolt 15 serves for the pivotal connection of a clevis 16 secured to a transversely extending earth-working tool 17 by means of the straps 18. The working tool 17 thus has pivotal movement about the bolt 15 as an axis.

The earth-working implement 17 is in the form of an earth-moving or leveling tool of the bowl type having a lower edge provided with a blade 18 and braced at spaced points therealong by straps 19. At this point it should be clear that the tool 17 is mounted on the tractor for generally vertical swinging movement about the pivots provided on the brackets 7.

Raising and lowering of the tool with respect to the tractor is accomplished by a lifting mechanism now to be described. Rockably supported in brackets 20 secured to the opposite sides of the tractor body 1 is a transverse shaft 21. Shaft 21 projects through openings in the lower ends of brackets 20 and is held against displacement by washers 22. Mounted upon the right-hand end of the shaft 21 is a sleeve 23 to which is secured as by welding a generally vertically extending arm 24. Likewise welded to the sleeve 23 is a rearwardly extending arm 25. Pivotally connected to the upper end of arm 24 is a pipe 26 having a bore to receive therein a piston rod 27 of a power cylinder 28, for example, of the single acting type, the piston rod 27 having its stroke within pipe 26 limited by a shoulder 29 in the pipe. The cylinder 28 is secured to the upper end of the bracket 7 on the right-hand side of the tractor body. Likewise pivoted upon the upper end of the bracket 7 is a lever arm 30 having pivotally attached intermediate its ends a forwardly extending bar 31 downwardly curved at its forward end and pivotally connected to a swivel 25a, apertured to slidably receive the piston 27 and arranged to abut the rear end of the pipe 26. Bar 31 includes laterally spaced straps having secured therebetween near the forward ends thereof a swivel member 32 having a threaded opening to receive the threaded end of a crank 33, the rear end of which extends through a swivel 34 provided at the upper end of lever arm 30 and having a crank handle 35. Crank 33 may be manipulated by the tractor operator to adjust the throw of the piston rod 27 and the extent of movement of pipe 26. To the rear end of arm 25 is connected the upper end of a link 36, the lower end of which is pivotally connected to the right-hand bar 8 near its forward end. It will thus be seen that actuation of the cylinder 28 to advance the piston rod 27 will rock the arms 24 and 25 in a clockwise direction to raise the tool 17 from its earth-working position, as indicated in Figure 1, to the transport position shown in Figure 2.

Figure 2:
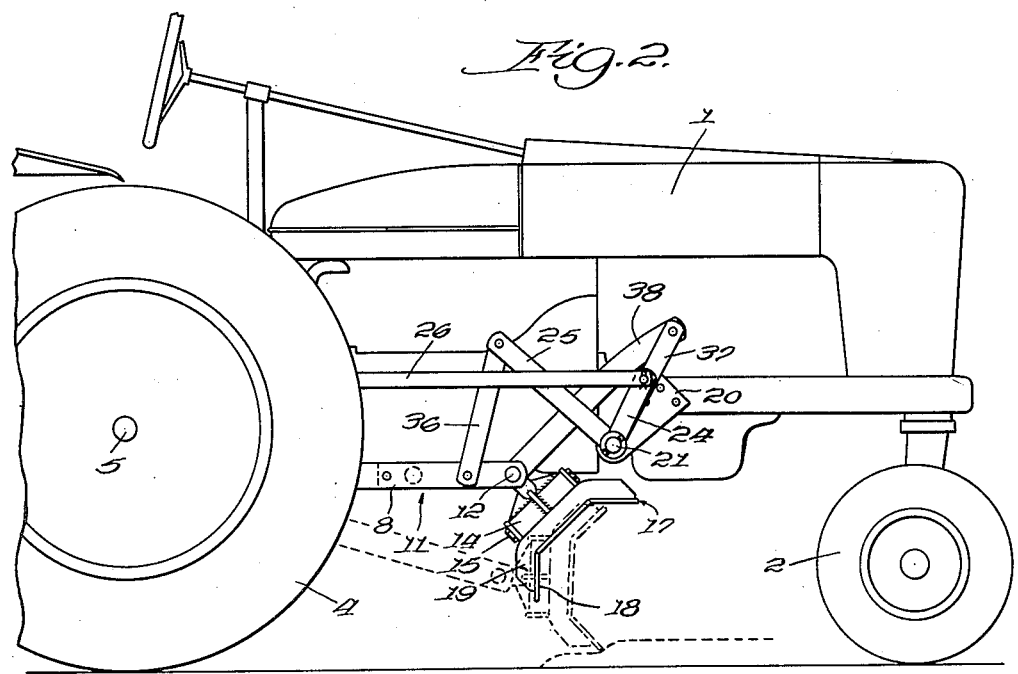
Figure 2 is a view similar to Figure 1 but showing the tool in transport position and in dotted lines the position occupied by the tool in the first range of vertical movement thereof.

In order to dump accumulated earth from the tool 17 and to cause it to assume the position shown in Figure 2, means are provided for tilting the tool about a transverse axis represented by the shaft 12 upon which the tool is mounted. This is accomplished by providing upon opposite ends of the shaft 21 beyond the washers 22 upwardly and rearwardly extending arms 37. Pivotally secured to the free end of each of the arms 37 are links 38, the lower ends of which are secured as by welding to opposite ends of the arched shaft 12. Arm 37 and link 38, therefore, constitute part of the lifting mechanism which also includes the cylinder and piston rod 28, 27, arms 24 and 25, and link 36. Upon rocking of arm 24 to raise the tool to transport position, the arms 8 of supporting member 11 move upwardly and cause arm 37 to move in a clockwise direction about shaft 21. Links 38 being secured to the shaft 12 cause rotation thereof and tilting of the tool 17 in the direction and in the manner indicated in Figure 2. However, due to the downward angling of the bars 8 in the working position of the tool, the tool rises upwardly in an arc about its pivot through a first range of movement in which substantially no tilting action occurs. Such a position of the tool is indicated in dotted lines in Figure 2 and is important in that it permits the operator of the tractor upon which the tool is mounted to utilize the leveling properties of the tool to their fullest advantage to spread dirt at various heights above the ground.

Figure 3:
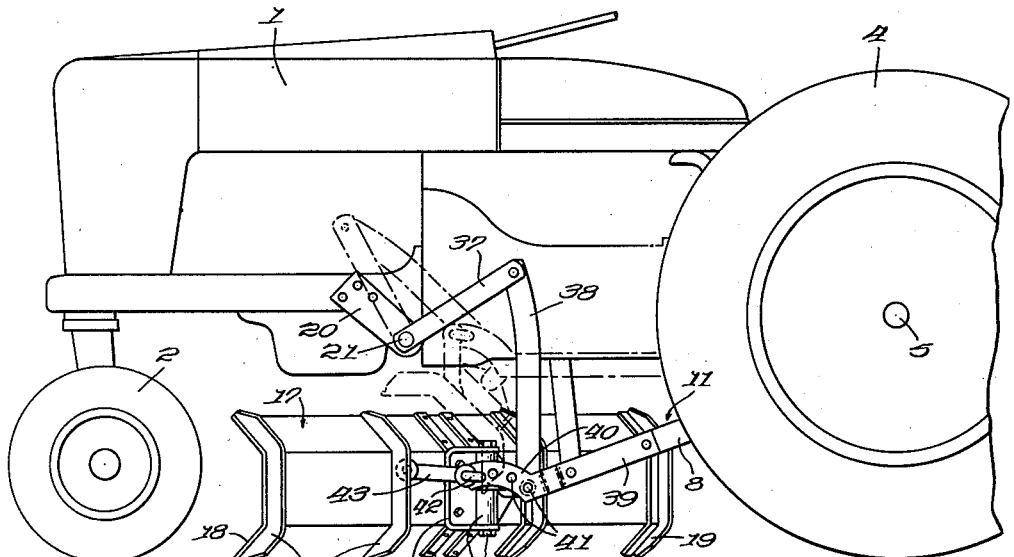
Figure 3 is a side elevation of the tractor from the opposite or left-hand side thereof and showing the connection of the lifting mechanism thereto.
Figure 4:
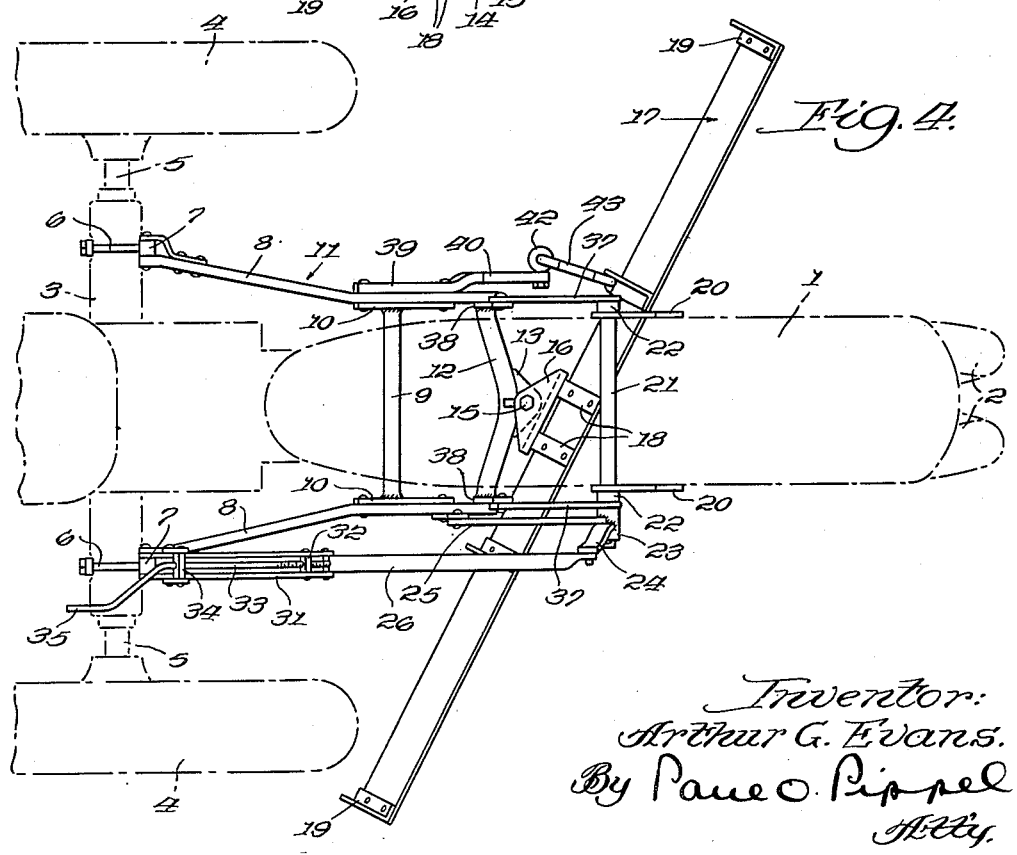
Figure 4 is a plan view of the structure shown in Figure 1.

When utilized for leveling only, it is often desirable that the working tool be operated at right angles with respect to the tractor or the direction of travel thereof. On the other hand, when employing the tool for grading or terracing purposes or the like, it is desirable that the tool travel at an angle with respect to the line of draft upon the tool less than a right angle. It is, therefore, desirable that mechanism be provided for swinging the tool horizontally about its pivot upon the bolt 15. Such mechanism includes a strap 39 bolted to the left-hand bar 8 and having a forwardly extending laterally spaced arm portion 40 provided with orifices 41 along the length thereof. These orifices 41 serve for the reception of an eye-bolt 42 to which is pivotally connected one end of a link 43, the forward end of which is pivotally connected to one of the straps 19 at a location laterally spaced from the pivot bolt 15. When it is desired that the tool operate at an angle less than a right angle with respect to the line of travel, as indicated particularly well in Figure 4, the link 43 is connected to the arm portion 40 at the forwardmost orifice 41 therein. In the working position of the tool as shown in Figure 3, this link 43 assumes a position generally in alinement with the arm portion 40 and in the manner of a toggle holds the tool at the chosen angle with respect to the line of travel. Variations, of course, in this angle may be provided by adjusting the link 43 to one of the other openings 41 in the arm portion 40. In the position shown in Figures 3 and 4, of course, link 43 acts as a thrust link rigid with the arm portion 40 to hold the tool in its angled position. However, upon raising the tool to transport position as indicated in dotted lines in Figure 3, the link 43 pivots upon the eye-bolt 42 and assumes a generally vertical position so that the pivotal connection of the link to the arm portion 40 and the pivotal connection thereto to the strap 19 on the tool are in generally vertical alinement and the tool has swung to a position at right angles with respect to the line of travel for transport. This transport position of the tool is important in that it assists the tool in avoiding the under carriage of the tractor and lessens the danger of damage to the tool in transport.

When it is desired to operate the tool at right angles to the direction of travel, the link 43 is connected to the arm portion 40 at the rearwardmost orifice 41 therein. In that position, the angle of the tool with respect to the line of travel does not change between working and transport positions.

The operation of the implement of the present invention should be clear from the foregoing description. However, it might be noted that upon actuation of the cylinder 28 to swing the arms 24 and 25 and raise the tool from a working to a transport position, as shown in the drawings, the twisting of shaft 12 causes tilting of the tool to dump the dirt therefrom and the tool is simultaneously swung into a position at right angles to the direction of travel for transport purposes. It may likewise be noted that the depth of operation of the tool may be manually adjusted by operation of the crank 33. Further, by the controlled admission of fluid into the hydraulic cylinder 28 without lifting the tool to a full transport position, the tool may be operated at suitable heights above the ground in a limited range to permit leveling operations to be carried out without substantially changing the angle of contact of the blade 18 with the soil.

While the invention has been described only in its preferred embodiment, it may be understood, of course, that modifications may be made therein without departing from the spirit of the invention or the scope of the appended claims.

What is claimed is:

1. In combination with a traveling support, an earth-working tool mounted thereupon and disposed transversely of the direction of travel of the support substantially parallel to the ground line, lift means on the support connected to the tool for raising and lowering the latter, linkage connected between the tool and the support and operative during vertical movement of the tool to tilt the latter about a transverse axis, and a pivoted link connection between lift means and one end of the tool and cooperative with said tilting linkage to accommodate lateral swinging of the tool horizontally to change its angle with respect to the direction of travel while maintaining its parallelism with respect to the ground line.

2. In combination with a traveling support, an earth-working tool mounted on the support and disposed transversely of the direction of travel, lifting mechanism on the support connected to the tool for raising and lowering the latter, a central pivoted connection between the lifting mechanism and the tool to accommodate swinging of the tool horizontally between an operative and a transport position, a pivoted link connected between the tool and the lifting mechanism at one side of said central pivot operative to accommodate and limit the horizontal movement of the tool, and linkage connected between the traveling support and the tool cooperable with said pivoted link and operative during raising and lowering thereof to rotate the tool about a transverse axis and effect horizontal movement thereof about said central pivot.

3. In combination with a traveling support, lifting mechanism including a tool carrier mounted on the support for generally vertical movement with respect thereto, a transversely extending shaft rockably mounted on said carrier, a transverse scraper, and means for securing the scraper to said shaft to provide tilting of the scraper upon rocking the shaft including generally vertical pivot means accommodating horizontal swinging of the scraper, connecting linkage between the support and said shaft operative upon vertical movement of the tool to rock the shaft and tilt the tool, and a pivoted link connecting the carrier to the scraper at one side of said vertical pivot to limit horizontal swinging of the scraper and cooperative with said connecting linkage to tilt and horizontally swing the scraper during vertical movement thereof.

ARTHUR G. EVANS.

REFERENCES CITED

The following references are of record in the file of this patent:

UNITED STATES PATENTS

| Number | Name | Date |
|---|---|---|
| 1,739,352 | Choate | Dec. 10, 1929 |
| 1,986,173 | Wold | Jan. 1, 1935 |
| 1,997,001 | Lamb | Apr. 9, 1935 |
| 2,001,803 | Stephens | May 21, 1935 |
| 2,160,595 | LeBleu | May 30, 1939 |
| 2,191,323 | Richter | Feb. 20, 1940 |
| 2,238,389 | Kerber | Apr. 15, 1941 |
| 2,311,553 | LeTourneau | Feb. 16, 1943 |
| 2,365,677 | Burns | Dec. 26, 1944 |
| 2,371,502 | Burns | Mar. 13, 1945 |
| 2,404,760 | Washbond | July 23, 1946 |